United States Patent [19]

Mercer

[11] 4,394,743
[45] Jul. 19, 1983

[54] TONE GENERATION METHOD AND APPARATUS USING STORED REFERENCE CALIBRATION COEFFICIENTS

[75] Inventor: Paul A. Mercer, Parsippany, N.J.

[73] Assignee: Bell Telephone Laboratories, Incorporated, Murray Hill, N.J.

[21] Appl. No.: 217,678

[22] Filed: Dec. 18, 1980

[51] Int. Cl.³ .................... G10H 5/10; H04M 1/50
[52] U.S. Cl. .................... 364/514; 364/607; 364/718; 179/84 VF; 340/347 DA
[58] Field of Search ............ 364/514, 718, 607, 851, 364/852; 179/84 VF, 170.2; 340/347 DA; 84/1.01, 1.04

[56] References Cited

U.S. PATENT DOCUMENTS

| | | | |
|---|---|---|---|
| 3,708,659 | 1/1973 | Schirmer et al. | 364/852 |
| 4,017,693 | 4/1977 | Roche et al. | 179/84 VF |
| 4,058,805 | 11/1977 | Lake | 340/347 DA |
| 4,066,977 | 1/1978 | Chambers et al. | 330/129 |
| 4,110,567 | 8/1978 | Boucher | 179/84 VF |
| 4,132,871 | 1/1979 | Lake | 179/84 VF |
| 4,161,633 | 7/1979 | Treiber | 179/170.2 |
| 4,196,318 | 4/1980 | Nelson | 179/84 VF |
| 4,201,105 | 5/1980 | Alles | 84/1.01 |
| 4,227,248 | 10/1980 | Munter | 179/84 VF X |

*Primary Examiner*—Edward J. Wise
*Attorney, Agent, or Firm*—C. S. Phelan

[57] ABSTRACT

A tone generator operates in a multiplicative (19) manner with respect to a reference signal (20) for providing a selectable sequence of tones. A digital calibration coefficient is constructed for at least one tone for modifying (22) the reference signal to a value that produces a predetermined output amplitude for the tone. The coefficient is stored (16) for subsequent recall each time the predetermined output amplitude for the tone is required.

18 Claims, 1 Drawing Figure

TONE GENERATION METHOD AND APPARATUS USING STORED REFERENCE CALIBRATION COEFFICIENTS

FIELD OF THE INVENTION

This invention relates to tone generators, and it relates in particular to a self-calibrating generation method and apparatus for supplying tone sequences.

BACKGROUND OF THE INVENTION

In measuring and testing systems, it is at times necessary to provide a selectable sequence of tones in as short an interval as possible. Such tones should have a predetermined calibrated amplitude which is relatively free of temperature and aging effects which commonly affect transmission characteristics of circuit elements such as coupling transformers. Known tone generating circuits have analog feedback control arrangements, but these usually require a significant settling interval each time that a particular tone is called for. The result is a corresponding lengthening of the time required to produce a sequence of at least one occurrence of each of a plurality of different tones of calibrated amplitude. Separate continuously running tone generation circuits could be employed for the respective tones required and wherein each such circuit includes its own stabilizing control. However, this requires substantial generating circuitry thereby increasing the size and weight of the test equipment including such tone generators. The circuit complexity can be reduced to some extent by switching outputs of the tone generators to provide the respective tones through a common output interface coupling device, such as a transformer. However, such a device is often one of the principle sources of the offending temperature and aging effects; and its contribution to the effects would not be compensated by the operation of individual generator stabilizing feedback circuits that do not include it.

Various circuits are known in the art which include some digital circuit portions in an amplitude control circuit. Two examples which utilize digital counting links are shown in the R. P. Chambers et al. U.S. Pat. No. 4,066,977 on an automatic gain control amplifier and the R. Treiber U.S. Pat. No. 4,161,633 on a line circuit with a regulated signal generation function. However, the systems in these patents must be initialized, i.e., recalibrated, each time that a discrete new signal is to be produced.

It is also known as shown, for example, in the H. G. Alles U.S. Pat. No. 4,201,105, to store digital characters representing successive sample magnitudes of a known waveform and read these digital samples out through a multiplier when it is desired to produce a wave of the same basic configuration with a selectable amplitude. However, the Alles disclosure does not deal with the amplitude calibration problem.

BRIEF DESCRIPTION OF THE DRAWING

A more complete understanding of the invention and the various features, objects, and advantages thereof may be obtained by consideration of the following detailed description in connection with the appended claims and the attached single-FIGURE drawing which contains a diagram, partly in schematic form and partly in block and line form, of a test tone source utilizing the present invention.

DETAILED DESCRIPTION

Figure 1:
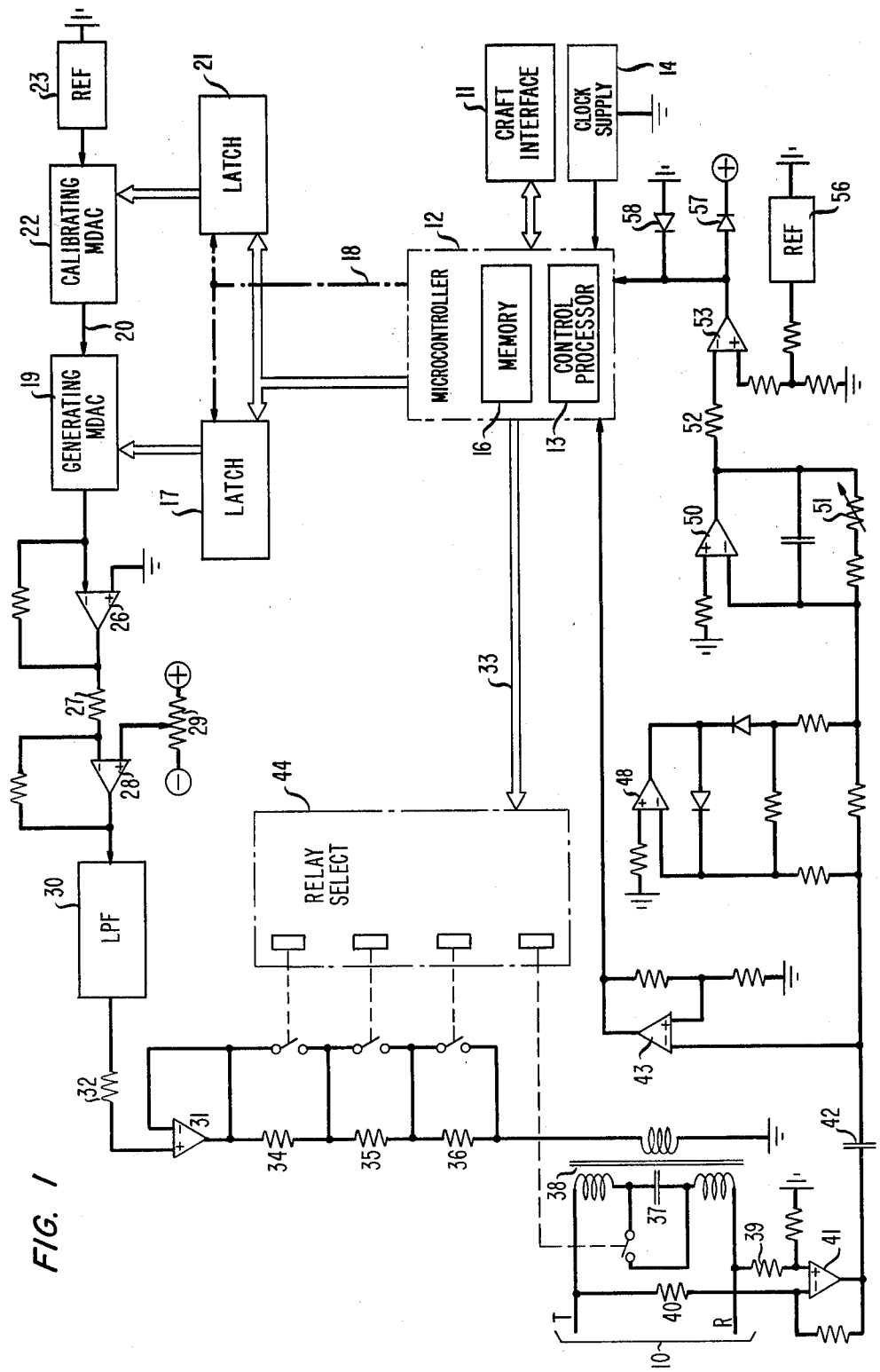

In the drawing, the illustrated test tone source is connectable across a telephone system subscriber circuit 10 including a tip lead T and ring lead R. Such a circuit is advantageously one for providing service from a telephone system central office (not shown) to a private branch exchange (not shown) on the subscriber's premises. Such a subscriber circuit is intended to provide a predetermined minimum grade of service for the subscriber's communications. The test tone source is illustratively connectable at the subscriber's end of the circuit in substitution for the private branch exchange.

When the test tone source is to be utilized, the source responds to signals from the central office end of the circuit 10 by transmitting back to the central office on the circuit 10 at least one predetermined series of tones included in a circuit testing sequence. These tones are then measured at the central office to determine the extent of gain and/or equalization that should be provided in the circuit 10 at the central office in order to assure at least the aforementioned minimum grade of service. It is therefore not necessary that the test tone source be permanently connected to the circuit 10. However, it is necessary that the tones provided from the source have predetermined amplitudes and frequencies at the subscriber end of the circuit 10 so that such information can be used at the central office as a reference for computing the extent of gain and equalization that are required.

The illustrated test tone source advantageously operates under the control of signals received from the central office by way of the subscriber circuit 10. An interface 11 advantageously includes audible and visual signaling devices (not shown) for indicating to craft personnel the operational status of the test tone source. For example, such signals may indicate that the test tone source has been powered up or that the test sequence has been completed. In addition, manual controls (not shown) are provided for use by craft personnel to initialize the test tone source for cooperation with central office equipment and/or personnel.

The interface 11 is bidirectionally coupled to a test tone source microcontroller 12 which includes at least a control processor 13 and a memory 16. Microcontroller 12 responds to received inputs from circuit 10 to follow correspondingly designated parts of a stored program to control the generation of calibrated amplitude tones and sequences thereof. The microcontroller 12 is advantageously a microcomputer such as the 8748 microcomputer of INTEL Corporation and which includes various arithmetic, logic, and memory capabilities, as well as an internal clock, as is well known in the art. An external clock supply 14 is advantageously provided to synchronize the internal clock to establish a desired clock precision for assuring a source output frequency needed for the central office measurements if the microcomputer internal clock is not sufficiently stable for that purpose.

In the illustrated test tone source, tone generation is achieved by multiplying digital coefficients defining a sampled analog waveform, e.g., a sine wave, by an analog reference signal. To this end, digitally coded sample amplitude values defining a cycle of a sine wave are stored in memory 16. A selectable set of those samples is read out of the memory under control of the processor clock to a latch 17. That latch is advantageously an array of bistable circuits into which signals are loaded in bit-parallel and unloaded in bit-parallel. Loading is enabled at each sample time of a tone burst, in accordance with the microcontroller program, by outputting from the microcontroller 12 on leads 18 a write strobe and an address signal uniquely designating the latch 17. Until it is overwritten, the digitally coded coefficient information contained in the latch is continuously coupled in bit-parallel to the digital input connections of a multiplying digital-to-analog converter (MDAC) 19. In that converter, the digital coefficient information is multiplied by the value of an analog reference signal applied on a lead 20 from a reference signal source which will be subsequently described. MDAC 19 provides the resulting analog product output signal in the form of a stepped sine wave with steps corresponding to successive samples provided to the MDAC from microcontroller 12 through latch 17.

The reference signal supplied on the lead 20 has an amplitude which is fixed for a representative tone in a range of tones which are to be generated by the test tone source. Alternatively, a separate reference signal is fixed either for each of plural parts of that range or for each of the aforementioned tones which is to be generated, and the description which follows relates to the latter case.

As earlier described, the amplitudes of signals generated by the illustrated test tone source are variable because of temperature changes and component aging. Feedback could be used to modify the waveform coefficients applied to the MDAC 19, but that requires employment of some of the coefficient bit capacity for expressing amplitude adjustments and thus reduces bit capacity available to express the desired standard wave configuration. This results in a reduction in frequency purity of the generated tone. A sampled wave, such as the stepped wave output of MDAC 19, normally includes extraneous frequency components such as the sampling frequency; but they are spectrally spaced from the frequency of the desired tone by an amount that allows relatively inexpensive filtering to smooth out the sampling steps. On the other hand, it has been found that the inclusion of amplitude compensation effects in the wave coefficients increases quantizing error in the wave samples; that increases the amplitudes of harmonics due to that error and which are within the passband of a low pass filter normally employed to smooth out the sampled wave steps; and those increases make it more difficult for the central office equipment to obtain a meaningful tone measurement.

Alternatively, automatic gain control of the analog reference signal appearing on lead 20 would involve the difficulty of storing an appropriate feedback signal for the production of each of plural tones of calibrated amplitude in a rapid sequence. There may also be additional complexity in switching proper stored signals into the tone generating circuit at proper times in a tone generation sequence.

The foregoing amplitude compensating difficulties are resolved in the illustrative embodiment by establishing, in a manner to be described, a digital calibration coefficient for each tone and storing the coefficients for later recall to control the analog reference signal during the generation of a burst of the tone. Thus, before waveform coefficients are applied to latch 17 to generate a particular tone, the corresponding calibration coefficient is recalled from memory 16 and loaded into a latch circuit 21 when enabled by appropriate write strobe and address signals on leads 18. Latch 21 is advantageously of the same type as latch 17. This calibration coefficient is then continuously applied to a calibrating MDAC 22. the output from the MDAC 22 is applied on the lead 20 to the generating MDAC 19. An analog input to the calibrating MDAC 22 is provided from a direct current reference source 23 having a low temperature coefficient of output voltage variation.

A number of commercially available MDACs are suitable for the functions indicated for the MDACs 19 and 22. Two examples include the DAC0800 8-bit digital-to-analog converter of the National Semiconductor Corporation and the 502FR MDAC of the Western Electric Company.

The temperature coefficient of source 23 is about an order of magnitude lower than the temperature coefficient of all other circuit elements combined in the tone generating signal path of the test tone source in the drawing. Two suitable reference sources are the 502AA voltage reference of the Western Electric Company and the LH0070 voltage reference of the National Semiconductor Corporation. Each has a maximum temperature variation of about 0.9% over the expected operating temperature range.

A calibrating coefficient remains in the latch 21 throughout the generation of a burst of the corresponding tone. The latch 17 is then cleared from the controller 12 by overwriting a one-half-maximum-value word into the latch to prevent tone output to the circuit 10 between tone bursts.

The analog output from an MDAC is typically a current signal whereas a voltage signal is normally required for the circuit 10. Accordingly, the output of MDAC 19 is applied to the inverting input of an operational amplifier 26 that is connected to operate as a current-to-voltage converter in a manner well known in the art. Since such amplifier connections, and others to be hereinafter mentioned, are well known, they are only generally represented in the drawing. A series resistor 27 couples the output of amplifier 26 to the inverting input of another operational amplifier 28. That amplifier is arranged, again as is well known in the art, to remove direct current offset in the output of the amplifier 26. Adjustment of the tap on a supply potential divider 29 determines the extent of correction so that the generated signal will have a waveform which is essentially symmetrical about the zero voltage level referenced to the supply voltage of a following active filter 30. That wave is coupled through the active low pass filter 30 having a cutoff frequency chosen to smooth out the sampling steps in the sinusoidal wave.

Different frequencies are generated by selecting different sets of the stored samples of the standard wave for output at a uniform sample output clock rate regardless of the frequency being generated. Thus, the period of the stored wave with all of its samples produced at that rate represents the lowest frequency which is to be generated. However, if, for example, alternate ones of the samples in the time phase sequence of the stored wave are selected to be outputted at the same clock rate from the controller 12, the result is a wave having half the period and twice the frequency of that lowest frequency waveform. Other output frequencies are achieved by similarly selecting different sets of the stored wave samples.

Yet another operational amplifier 31 is connected as a line driver buffer and receives at its noninverting input connection, by way of a series resistor 32, the output of the low pass filter 30. Output from amplifier 31 is coupled to circuit 10 through a series of selectable resistors 34–36 and a coupling transformer 38. A capacitor 37 is connected in series between the two halves of the transformer secondary winding. A separate set of normally open relay contacts is connected across each of the resistors 34–36 and the capacitor 37. Those contacts are operated by four relays, respectively, in a relay select circuit 44 which is controllable by signals provided on a bus 33 from the controller 12. Control signals from the central office are illustratively received to specify the test tone source impedance. Controller 12 translates that impedance information into bus 33 signals to select impedances to present to the tip and ring leads of circuit 10 substantially the same impedance as that which is presented to those leads by a subscriber terminal equipment when the test tone source is removed from the circuit 10.

As previously discussed herein, an interface connection, such as that represented by the transformer 38, in a tone supply path is subject to temperature and aging effects. However, for circuit testing and measuring purposes, it is necessary that the tones provided from the source have a known amplitude in order that central office measurements will be meaningful. This problem is illustratively resolved by providing in microcontroller 12, a control program which causes the tone generation facility of the source to be calibrated on command from the central office. In addition, the program can cause calibration at the outset of a test sequence. Calibration is accomplished by establishing a value for the analog reference signal for the generating MDAC 19 for each tone to be generated. That reference signal then has a fixed value for the temperature and aging conditions prevailing at that time; and data is stored in memory 16, in the form of the corresponding calibration coefficient previously mentioned, to make that fixed reference value available each time that particular tone is thereafter generated in the same test sequence. The same coefficient is retained until a new calibration is ordered even though the sequence may be interrupted to generate other tones, to allow time delays between tone bursts, or to receive signals into the test tone source from the circuit 10.

Calibration is accomplished by use of a signal path connected across the circuit 10, or alternatively across a predetermined calibrating impedance (not shown) substituted for circuit 10 during calibration, through series resistors 39 and 40 to the noninverting and inverting input connections of an operational amplifier 41. That amplifier is connected as a buffer amplifier to cooperate with those resistors to present to the circuit 10 a bridging impedance which is much higher than the impedance seen looking either back toward the central office or into the secondary winding of the transformer 38. An output of amplifier 41 is coupled through a capacitor 42 and two separate signal paths to different inputs of microcontroller 12. One path supplies command signals from the central office to one input of the microcontroller 12, and the other path represents a self-calibrating signal feedback path to a different input of the microcontroller 12. Of course, all signals from the circuit 10, as well as feedback signals from transformer 38, are applied to both paths; but microcontroller 12 is receptive to signals from the respective branches at different times in its program. For example, it is responsive to the feedback circuit only during those times when tones are being generated in a calibrating phase of a test sequence. It is expected at such times that no signals will be received from the central office by way of the circuit 10.

In the command signal path, the inverting input of an operational amplifier 43 is coupled to receive signals from capacitor 42. Amplifier 43 is connected in a manner now known in the art to operate as a comparator with hysteresis. That is, the input signal provided at its inverting input connection must increase through a first voltage threshold magnitude before the amplifier output changes state to reflect the input signal change. Thereafter, the input signal must decrease through that first threshold and through a second lower threshold magnitude before the amplifier output changes state again to reflect the latter input signal change. These two threshold values are separated by a voltage which is somewhat less than the desired input peak-to-peak swing, and they are illustratively of opposite polarities. This type of operation suppresses the effects of noise signals having amplitudes between the threshold values, and it causes the comparator output to be a rectangular wave of the same frequency as the input command signal but shifted in phase with respect to that input by an amount which is dependent upon the input wave configuration and the threshold levels.

Assume that microcontroller 12 is in a received signal decoding mode, i.e., a condition reached when the last ordered routine has been completed and the microcontroller is awaiting a new command from circuit 10 or interface 11. Processor 13 causes the counting of clock signals at a frequency higher than the command signal frequency and occurring during the respective comparator output signal half cycles. Counts thus obtained are compared to a predetermined threshold value stored in memory 16 and which represents a count that should be obtained if the command frequency is being received. When different predetermined numbers of half cycles of the command frequency have been received without interruption, the bursts represented thereby are interpreted by the controller 12 as corresponding different control commands directing certain test sequence subroutines. Such subroutines can include, for example, calibrate, send tone series A, send tone series B, and test sequence complete. In the latter case, an appropriate signaling device in interface 11 is activated to alert craft personnel to remove the test tone source from the circuit 10 and connect the subscriber's terminal thereto.

In the calibrating feedback branch for the coupling between buffer amplifier 41 and controller 12, the signal is coupled through a full wave rectification and averaging circuit including operational amplifiers 48 and 50 and their associated impedances and diodes, all connected in a manner well known in the art. The filtering function has a cut-off frequency at a fraction of one Hertz so that it essentially smooths the rectified signal to produce a direct-current level signal output. A rheostat 51 is included in the amplifier 50 feedback arrangements for adjusting the gain of the filter stage. That gain is set so that when the predetermined source output calibrated amplitude is being applied to circuit 10, the amplifier 50 output will have a magnitude which is equal, after coupling through a resistor 52 to the inverting input of a comparator amplifier 53, to the signal applied at the comparator noninverting input connection from a reference voltage source 56. That source 56 is another low temperature coefficient source that is advantageously of the same type as the reference source 23. Output signals from comparator 53 are coupled through a limiter circuit including diodes 57 and 58 to an input of the microcontroller 12. The circuit imposes upper and lower limits on the comparator output to protect microcontroller input circuits.

When the microcontroller 12 is operating in a self-calibrating mode, e.g., at the beginning of a test sequence, a successive approximation process is executed using the comparator 53 output as a digital error signal to construct a digital calibration coefficient character to be stored in the memory 16 as the calibrating reference coefficient for the tone which is then being generated. This is the calibrating coefficient which was previously described as being applied to the calibrating MDAC 22 during tone generation.

In the successive approximation process, a coefficient word in memory 16 begins in the one-half-maximum-word value condition, i.e., the most significant bit is a ONE. A burst of a first desired tone is generated using the MDAC 19; and at this time, the averaged direct current feedback through the amplifier 50 may be greater or less than the reference input to the comparator 53. Assuming that it is less than the reference input, the comparator 53 output is high; and the processor 13 sets the next most significant bit of the coefficient word in memory 16 to the binary ONE condition. If it had been greater than the reference, the comparator output would have been low; and the processor 13 would have reset the most significant bit and set the next less significant bit to ONE. Latch 21 is then reloaded with the coefficient word as just modified, and another burst to the same tone is generated using MDAC 19. Again, processor 13 in microcontroller 12 samples the output of comparator amplifier 53 and repeats the foregoing steps of setting the bit under test to the appropriate binary value and setting the next less significant bit to ONE for testing. Latch 21 is again reloaded with the coefficient word as just modified for the second time. The same operation is repeated on successively less significant bits of the coefficient word until all bits of the word have been set to the appropriate binary conditions. These conditions represent a coefficient value which, when applied to the calibrating MDAC 22 causes the generated output tone amplitude to produce a signal at the inverting input to comparator 53 which is approximately equal to the reference 56 input to that comparator. That output tone amplitude is the calibrated amplitude used as a reference by the central office to measure the characteristics of circuit 10. The same successive approximation process is repeated for each of the tones which the test tone source must be able to produce to construct a separately stored calibration coefficient word for that tone.

Thereafter, when commanded in a test sequence to produce one or more of the tones, controller 12 selects the corresponding reference coefficient for each tone in turn and loads it into the latch 21 for use by the calibrating MDAC 22. A burst of each of the ordered tones is generated in the predetermined order and using its corresponding calibration coefficient in the manner previously described.

Alternatively, different tones, or different bursts of a given tone, or different portions of a single burst of a tone are produced with different predetermined amplitudes. The corresponding different calibration signals are produced by, e.g., providing plural selectable potential dividing circuit configurations for coupling reference source 56 to the noninverting input of amplifier 53. Selection is advantageously controlled by microcontroller 12 during the calibration mode of operation by means of, e.g., another relay select circuit or other appropriate logic.

Although the present invention has been described in connection with a particular embodiments thereof, it is to be understood that additional embodiments, modifications, and applications which will be obvious to those skilled in the art are included within the spirit and scope of the invention.

What is claimed is:

1. A tone signal generator including a source (16) of selectable sets of digital coefficient signals defining a predetermined analog signal waveform, and means (19) for multiplying said coefficient signals by a reference signal for producing an analog tone signal which is recurrent at a predetermined rate, the generator comprising means (53, 13) for feeding back the output of said generator to control the magnitude of said reference signal for establishing a predetermined generator output tone amplitude.

2. The generator in accordance with claim 1 in which said feedback means comprises means (53), responsive to said recurrent analog signal, for generating an error signal which is indicative of the recurrent analog signal amplitude with respect to an additional reference, means (13), responsive to said error signal, for producing a calibration signal, and means (22), responsive to the calibration signal, for modifying the multiplying means reference signal in a direction tending to change the output tone amplitude toward the predetermined amplitude.

3. The generator in accordance with claim 2 in which said generating means includes means for producing a digital error signal having one or the other of two binary signal states, and said modifying means includes means responsive to said digital error signal for modifying the multiplying reference signal in a direction tending to change the state of said error signal.

4. The generator in accordance with claim 2 in which said source produces coefficient signal sets for plural selectable tones in a predetermined frequency range, said calibration signal producing means includes means for producing one calibration signal for said frequency range, and means for applying said one calibration signal in said modifying means for each of said plural tones.

5. The generator in accordance with claim 2 in which said source produces coefficient signal sets for plural selectable tones in a predetermined frequency range, and said calibrating signal producing means includes means for producing at least two different calibration signals for different parts, respectively, of said range, and means for applying each of said calibration signals in said modifying means for tones in said respective different parts of said frequency range.

6. The generator in accordance with claim 2 in which said source produces coefficient signal sets for plural selectable tones in a predetermined frequency range, and said calibrating signal producing means includes means for producing plural calibration signals for at least one of said tones, and means for applying each of said calibration signals for a tone in said modifying means for a different time part of the generation of such tone during the operation of said generator.

7. The generator in accordance with claim 2 in which
said source produces coefficient signal sets for plural selectable tones in a predetermined frequency range, and
said calibration signal producing means includes
means for producing plural calibration signals for at least one of said tones, and
means for applying each of said plural calibration signals for a tone in said modifying means for a different selectable generation of such tone in the operation of said generator.

8. The tone generator in accordance with claim 2 in which said modifying means further comprises
a calibrating MDAC (22) connected for providing said multiplying means reference signal, and
a low temperature coefficient analog reference signal source (23) connected to provide a stable analog reference to said calibrating MDAC, said reference signal source having a much lower temperature coefficient of output voltage than other elements of said tone generator.

9. The tone generator in accordance with claim 2 in which
said multiplying means comprises a generating, multiplying, digital-to-analog converter (19) (MDAC), and
said calibration signal producing means comprises means (13) for processing signals to produce said calibration signal and memory means (16) for storing said calibration signal.

10. The tone generator in accordance with claim 9 in which said processing means comprises
means for executing a successive approximation process in response to said error signal for setting, as said calibration signal, respective digits of a digital reference coefficient signal, and
means for storing said digital reference coefficient signal in said memory means to be subsequently called during an output tone generating sequence.

11. The tone generator in accordance with claim 9 in which
said processing means includes stored program control means for controlling said memory means to supply selectable coefficient sets to said generating MDAC to cause the output therefrom to include a predetermined series of tones and for correspondingly sequentially modifying said multiplying reference signal.

12. The tone generator in accordance with claim 11 in which there are provided
a bidirectional circuit (10) for outputting tone signals produced by said generator and for receiving command signals for said generator, and
means (43) for applying said command signals to an input of said processing means for controlling tone series selection in such processing means.

13. The tone generator in accordance with claim 12 in which
said command signal applying means comprises means for suppressing noise in a predetermined amplitude range less than the range of said command signals.

14. The tone generator in accordance with claim 13 in which
said command signals are tone bursts of coded durations,
said noise suppressing means comprises an amplitude comparator with hysteresis, and
said processing means comprises
means for providing clock pulses,
means for counting processing means clock pulses between output signal level transitions from said amplitude comparator,
means for comparing output from said counting means to a predetermined threshold value which is indicative of the frequency of said command signals, and
means, responsive to the output of said count comparing means, for decoding detected tone burst durations to control said processing means for tone series selection.

15. An analog signal tone generator including a source (12) of at least one set of digital coefficient signals defining an analog waveform of predetermined configuration, and means (19), having an analog reference signal input and responsive to said coefficient signals, for producing said analog signal tone, the generator comprising
means (53), responsive to said analog signal tone, for generating a digital error signal indicating a difference in magnitude between said tone and a predetermined reference, and
means (13, 22), responsive to said digital error signal, for modifying said analog reference signal to reduce the magnitude of said difference.

16. A method for generating at least one tone having a predetermined output amplitude, the method using a multiplication process with respect to a reference signal and comprising the steps of
operating the process to produce tone output of uncalibrated amplitude,
constructing in response to said tone output a calibrating signal having a value which, when applied to modify said reference signal, causes said uncalibrated amplitude tone output to assume said predetermined output amplitude for such tone, and
modifying said reference signal in response to said calibrating signal.

17. The method in accordance with claim 16 comprising the additional steps of
storing said calibrating signal for recall, and
recalling said stored calibrating signal to modify said reference signal each time that said one tone is generated.

18. The method in accordance with claim 16 in which a plurality of said tones are to be generated in a predetermined series and having, respectively, at least one predetermined output amplitude, the method further comprising the steps of
executing said operating and constructing steps for each of said tones to produce corresponding calibrating signals therefor,
storing said calibrating signals, and
thereafter, when each of said tones is to be generated in said series, recalling its corresponding calibrating signal and executing said modifying step using the recalled signal.

* * * * *

UNITED STATES PATENT AND TRADEMARK OFFICE
CERTIFICATE OF CORRECTION

PATENT NO. : 4,394,743

DATED : July 19, 1983

INVENTOR(S) : Paul A. Mercer

It is certified that error appears in the above—identified patent and that said Letters Patent is hereby corrected as shown below:

Column 4, line 3, "the" should read --The--. Column 7, line 29, "to" should read --of--. Column 8, line 4, "embodiments" should read --embodiment--; line 44, blank space after "range," should read --and--.

Signed and Sealed this

Third Day of July 1984

[SEAL]

Attest:

GERALD J. MOSSINGHOFF

Attesting Officer

Commissioner of Patents and Trademarks